United States Patent
Saxton et al.

(10) Patent No.: US 12,367,387 B2
(45) Date of Patent: Jul. 22, 2025

(54) NEURAL NETWORK OPTIMIZATION USING CURVATURE ESTIMATES BASED ON RECENT GRADIENTS

(71) Applicant: DeepMind Technologies Limited, London (GB)

(72) Inventors: David William Saxton, London (GB); Eshaan Nichani, San Diego (CA)

(73) Assignee: DeepMind Technologies Limited, London (GB)

( * ) Notice: Subject to any disclaimer, the term of this patent is extended or adjusted under 35 U.S.C. 154(b) by 1085 days.

(21) Appl. No.: 17/337,820

(22) Filed: Jun. 3, 2021

(65) Prior Publication Data
US 2021/0383222 A1    Dec. 9, 2021

Related U.S. Application Data

(60) Provisional application No. 63/035,464, filed on Jun. 5, 2020.

(51) Int. Cl.
*G06N 3/08* (2023.01)
*G06F 17/18* (2006.01)
*G06N 3/047* (2023.01)

(52) U.S. Cl.
CPC ............... *G06N 3/08* (2013.01); *G06F 17/18* (2013.01); *G06N 3/047* (2023.01)

(58) Field of Classification Search
CPC ........... G06N 3/08; G06N 3/047; G06F 17/18
See application file for complete search history.

(56) References Cited

U.S. PATENT DOCUMENTS

| 10,769,528 B1* | 9/2020 | Wang ........................ G06N 3/08 |
| 2015/0073755 A1* | 3/2015 | Tang ........................ G06F 30/20 |
| | | 703/2 |
| 2015/0317126 A1* | 11/2015 | Lee .......................... G06F 7/544 |
| | | 708/625 |

(Continued)

OTHER PUBLICATIONS

Jamie Wieland, et al. "Stochastic Gradient Estimation using a Single Design Point" "https://www.researchgate.net/publication/221527963_Stochastic_Gradient_Estimation_using_a_Single_Design_Point" (Year: 2006).*

(Continued)

*Primary Examiner* — Beau D Spratt
(74) *Attorney, Agent, or Firm* — Fish & Richardson P.C.

(57) ABSTRACT

Methods, systems, and apparatus, including computer programs encoded on a computer storage medium, for training a neural network by estimating the objective function curvature based on current and previous gradients. In one aspect, a method comprises: sampling a batch of training data; and for each neural network parameter: determining, based on the current batch of training data, a respective current gradient of the objective function at the current iteration with respect to the current neural network parameter; estimating an objective function curvature with respect to the current neural network parameter based on (i) the current gradient of the objective function at the current iteration, and (ii) a respective previous gradient of the objective function at each of a plurality of previous iterations; and updating a current value of the neural network parameter based on the estimate of the curvature of the objective function.

20 Claims, 4 Drawing Sheets

(56) References Cited

U.S. PATENT DOCUMENTS

| | | | |
|---|---|---|---|
| 2020/0137394 A1* | 4/2020 | Shih | H04N 19/149 |
| 2021/0224634 A1* | 7/2021 | Chen | G01R 33/56545 |
| 2022/0245519 A1* | 8/2022 | Miyagawa | G06N 3/08 |

OTHER PUBLICATIONS

An, "The effects of adding noise during backpropagation training on a generalization performance," Neural Computation, Apr. 1996, 8(3):643-674.

Baydin et al., "Online learning rate adaptation with hypergradient descent," CoRR, Feb. 2018, arxiv.org/abs/1703.04782, 11 pages.

Berahas et al., "Quasi-newton methods for deep learning: Forget the past, just sample," CoRR, Sep. 2020, arXiv:1901.09997, 49 pages.

Berndt et al., "Estimation and inference in nonlinear structural models," Annals of Economic and Social Measurement, 1974, 175(3/4):653-665.

Blundell et al., "Weight uncertainty in neural networks," Proceedings of the 32nd International Conference on Machine Learning, 2015, 37:1613-1622.

Bottou, "Stochastic gradient learning in neural networks," Proceedings of Neuro-Nimes, 1991, 91(8):12.

Devlin et al., "BERT: Pretraining of deep bidirectional transformers for language understanding," CoRR, May 2019, arXiv:1810.04805, 16 pages.

Dong et al., "On the limited memory BFGS method for large scale optimization," Mathematical Programming, Aug. 1989, 45(1-3):503-528.

Duchi et al., "Adaptive subgradient methods for online learning and stochastic optimization," Journal of Machine Learning Research, Jul. 2011, 12(7):2121-2159.

Graves, "Practical variational inference for neural networks," Advances in neural information processing systems, 2011, pp. 2348-2356.

Guozhong, "The effects of adding noise during backpropagation training on a generalization performance," Neural Computation, Apr. 1996, 8(3):643-674.

He et al., "Deep residual learning for image recognition," Proceedings of the IEEE Conference on Computer Vision and Pattern Recognition, 2016, pp. 770-778.

Ioffe et al., "Batch normalization: Accelerating deep network training by reducing internal covariate shift," Proceedings of the 32nd International Conference on Machine Learning, 2015, 37:448-456.

Jaderberg et al., "Population based training of neural networks," CoRR, Nov. 2017, arXiv:1711.09846, 21 pages.

Kingma et al., "Adam: A method for stochastic optimization," CoRR, Jan. 2017, arxiv.org/abs/1412.6980, 15 pages.

Kirkpatrick et al., "Optimization by simulated annealing," Science, May 1983, 220(4598):671-680.

Liu et al., "On the limited memory BFGS method for large scale optimization," Mathematical Programming, Aug. 1989, 45(1-3):503-528.

Luo et al., "Adaptive gradient methods with dynamic bound of learning rate," CoRR, Feb. 2019, arxiv.org/abs/1902.09843, 19 pages.

Martens et al., "Optimizing neural networks with kronecker-factored approxi mate curvature," Proceedings of the 32nd International Conference on Machine Learning, 2015, 37:2408-2417.

Martens, "Deep learning via hessian-free optimization," International Concerence on Machine Learning, Jun. 2010, 27:735-742.

Neelakantan et al., "Adding gradient noise improves learning for very deep networks," CoRR, Nov. 2015, arxiv.org/abs/1511.06807, 11 pages.

Orabona et al., "Training deep networks without learning rates through coin betting," CoRR, Nov. 2017, preprint arXiv:1705.07795, 14 pages.

Radford et al., "Language models are unsupervised multitask learners," OpenAI blog, Feb. 2019, 1(8):9.

Schaul et al., "No more pesky learning rates," Proceedings of the 30th International Conference on Machine Learning, 2013, 28(3):343-351.

Schneider et al., "DeepOBS: A deep learning optimizer benchmark suite," CoRR, Mar. 2019, arXiv:1903.05499, 14 pages.

Srivastava et al., "Dropout: a simple way to prevent neural networks from overfitting," The journal of machine learning research, Jan. 2014, 15(1):1929-1958.

Such et al., "Deep neuroevolution: Genetic algorithms are a competitive alternative for training deep neural networks for reinforcement learning," CoRR, Apr. 2018, arxiv.org/abs/1712.06567, 16 pages.

* cited by examiner

NEURAL NETWORK OPTIMIZATION USING CURVATURE ESTIMATES BASED ON RECENT GRADIENTS

CLAIM OF PRIORITY

This application claims priority under 35 USC § 119(e) to U.S. Patent Application Ser. No. 63/035,464, filed on Jun. 5, 2020, the entire contents of which are hereby incorporated by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations for training a neural network having a set of neural network parameters to perform a machine learning task by optimizing an objective function.

According to a first aspect there is provided a method performed by one or more data processing apparatus for training a neural network having a plurality of neural network parameters to perform a machine learning task by optimizing an objective function, the method comprising, at each of a plurality of iterations: sampling a current batch of training data; for each neural network parameter of the plurality of neural network parameters: determining, based on the current batch of training data, a respective current gradient of the objective function at the current iteration with respect to the neural network parameter; estimating a curvature of the objective function with respect to the neural network parameter based on: (i) the current gradient of the objective function at the current iteration, and (ii) a respective previous gradient of the objective function at each of a plurality of previous iterations; and updating a current value of the neural network parameter based on the estimate of the curvature of the objective function with respect to the neural network parameter at the current iteration.

In some implementations, the curvature of the objective function with respect to the neural network parameter characterizes a second derivative of the objective function with respect to the neural network parameter.

In some implementations, estimating the curvature of the objective function with respect to the neural network parameter comprises: determining values of parameters of an approximation function that is configured to process a provided value of the neural network parameter to generate an estimate of a gradient of the objective function with respect to the neural network parameter when the neural network parameter has the provided value.

In some implementations, the approximation function is a linear function, the parameters of the approximation function comprise a slope parameter and a root parameter, and the slope parameter of the approximation function defines the estimate of the curvature of the objective function with respect to the neural network parameter.

In some implementations, processing a provided value of the neural network parameter to generate an estimate of the gradient of the objective function with respect to the neural network parameter when the neural network parameter has the provided value comprises: subtracting the value of the root parameter from the provided value of the neural network parameter; and multiplying: (i) the slope parameter, and (ii) a result of the subtraction.

In some implementations, determining the values of the parameters of the approximation function comprises: determining the values of the parameters of the approximation function to minimize an overall error, wherein the overall error is based on a respective error for the current iteration and each of the plurality of previous iterations, wherein the error for each respective iteration measures a difference between: (i) the gradient of the objective function at the iteration, and (ii) an estimate of the gradient of the objective function at the iteration that is generated by processing a value of the neural network parameter at the iteration using the approximation function.

In some implementations, the overall error comprises a linear combination of the respective error for the current iteration and each of the plurality of previous iterations, wherein each error is scaled by a respective weight coefficient.

In some implementations, the method further comprises updating a current value of each respective weight coefficient based on a respective value of the gradient of the objective function and a respective value of the neural network parameter at the current iteration and each of the plurality of previous iterations.

In some implementations, for each respective weight coefficient, updating the current value of the weight coefficient comprises: determining a target value of the weight coefficient based on: (i) a variance of the values of the gradient of the objective function, (ii) a variance of the values of the neural network parameter, and (iii) a covariance of the values of the gradient of the objective function and the values of the neural network parameter; updating the current value of the weight coefficient based on the target value of the weight coefficient.

In some implementations, determining the value of the slope parameter comprises: determining the value of the slope parameter as a ratio of: (i) a covariance of a respective value of the gradient of the objective function and a respective value of the neural network parameter over the current iteration and each of the plurality of previous iterations, and (ii) a variance of the respective value of the neural network parameter over the current iteration and each of the plurality of previous iterations.

In some implementations, determining the value of the root parameter comprises: determining the value of the root parameter as a difference between: an expectation of the respective value of the neural network parameter over the current iteration and each of the plurality of previous iterations, and a ratio of: (i) an expectation of the respective value of the gradient of the objective function over the current iteration and each of the plurality of previous iterations, and (ii) the value of the slope parameter.

In some implementations, the error for each iteration is a squared-error between: (i) the gradient of the objective function at the iteration, and (ii) the estimate of the gradient of the objective function at the iteration that is generated by processing the value of the neural network parameter at the iteration using the approximation function.

In some implementations, updating the current value of the neural network parameter comprises: determining a target value of the neural network parameter based on: (i) a sign of the curvature, and (ii) the value of the root parameter; and updating the current value of the neural network parameter based on the target value of the neural network parameter.

In some implementations, the sign of the curvature is non-negative, and determining the target value of the neural network parameter comprises: determining the target value of the neural network parameter to be equal to the value of the root parameter.

In some implementations, the method further comprises determining a trust region, wherein the trust region defines a range of numerical values, comprising: determining a center of the trust region based on an expectation of the respective value of the neural network parameter over the current iteration and each of the plurality of previous iterations, and determining a width of the trust region based on a variance of the respective value of the neural network parameter over the current iteration and each of the plurality of previous iterations; and clipping the target value of the neural network parameter to be included in the trust region.

In some implementations, the sign of the curvature is negative, and determining the target value of the neural network parameter comprises: determining the target value of the neural network parameter such that a distance between: (i) the target value of the neural network parameter, and (ii) the value of the root parameter, is greater than a distance between: (i) the current value of the neural network parameter, and (ii) the value of the root parameter.

In some implementations, updating the current value of the neural network parameter based on the target value of the neural network parameter comprises: setting the updated value of the neural network parameter equal to the target value of the neural network parameter.

In some implementations, updating the current value of the neural network parameter based on the target value of the neural network parameter comprises: sampling the updated value of the neural network parameter from a uniform probability distribution over a range of values that is centered on the target value of the neural network parameter.

According to another aspect, there is provided a system comprising: one or more computers; and one or more storage devices communicatively coupled to the one or more computers, wherein the one or more storage devices store instructions that, when executed by the one or more computers, cause the one or more computers to perform operations of the methods described herein.

According to another aspect there is provided one or more non-transitory computer storage media storing instructions that when executed by one or more computers cause the one or more computers to perform operations of the methods described herein.

The subject matter described in this specification can be implemented in particular embodiments so as to realize one or more of the following advantages.

The system described in this specification trains a neural network by, at each of multiple training iterations, using a recent history of gradients to estimate the curvature of the objective function, and using the estimated curvature to update the current values of the neural network parameters. Updating the current values of the neural network parameters using the estimated curvature, rather than relying solely on first-order gradient information, can enable the system to train the neural network to achieve an acceptable performance on a machine learning task over fewer training iterations, thereby reducing consumption of computational resources. Computational resources can include, e.g., memory and computing power.

The system described in this specification can efficiently approximate the curvature of the objective function using only first-order gradient information, by a procedure that has memory and computation requirements that are linear in the number of parameters of the neural network. In contrast, other optimization techniques using higher-order gradient information can require significantly more computation per iteration, and therefore, result in higher consumption of computational resources than the techniques described herein.

Throughout this specification, processing an image, e.g., using a neural network, can refer to processing intensity values associated with the pixels of the image using the neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
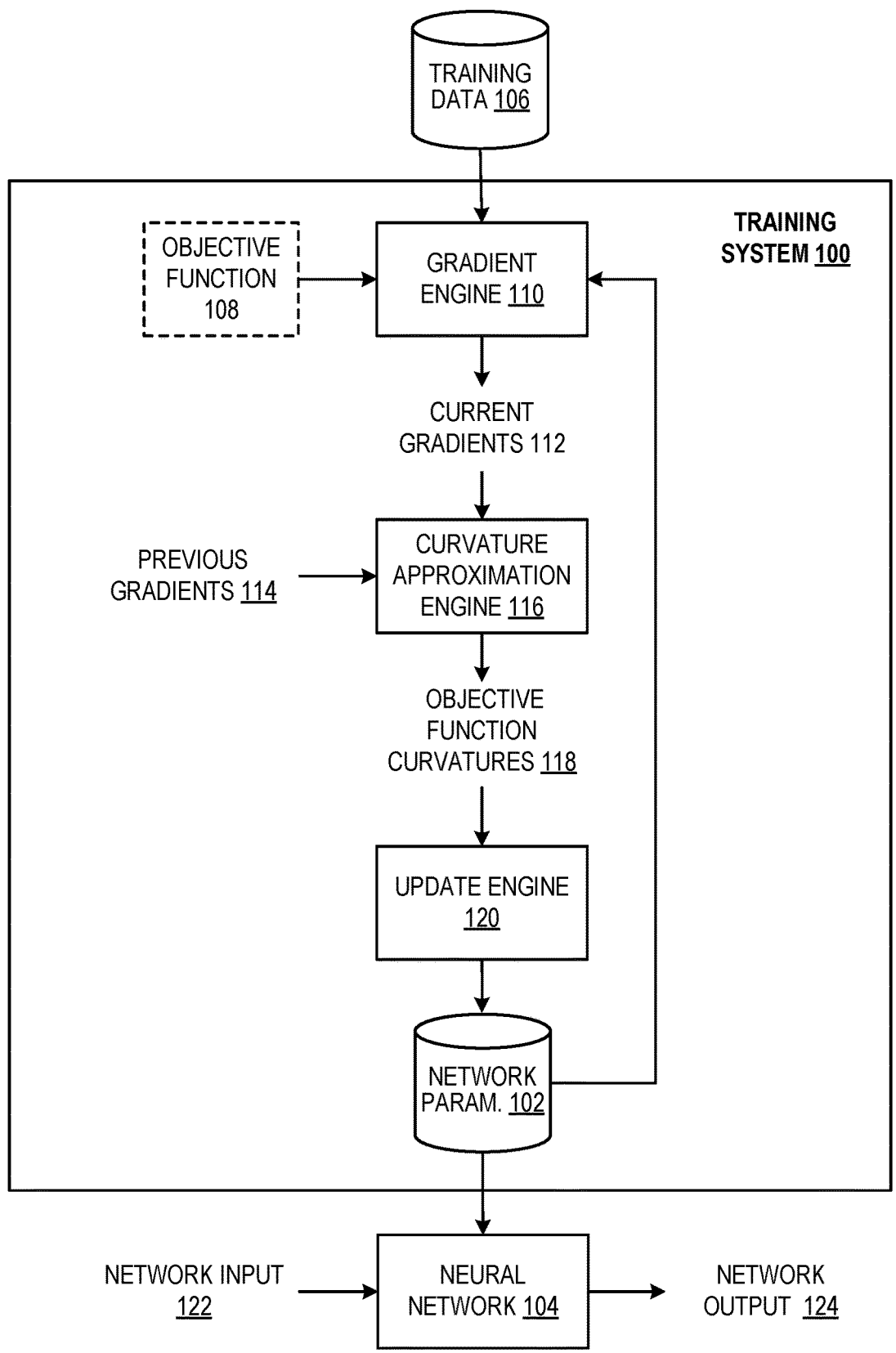
FIG. 1 is a block diagram of an example training system.

FIG. 1 is a block diagram of an example training system 100. The training system 100 is an example of a system implemented as computer programs on one or more computers in one or more locations in which the systems, components, and techniques described below are implemented.

The training system 100 trains the neural network 104 to perform a machine learning task, in particular, by repeatedly updating the values of the network parameters 102 of the neural network 104 to optimize an objective function, as will be described in more detail below.

The neural network can be configured to process any appropriate network input, e.g. network input 122. For example, the network input can include an image, an audio waveform, a point cloud (e.g., generated by a lidar or radar sensor), a representation of a protein, a sequence of words (e.g., that form one or more sentences or paragraphs), a video (e.g., represented a sequence of video frames), or a combination thereof.

The neural network can be configured to generate any appropriate neural network output, e.g., network output 124, that characterizes the network input. For example, the neural network output can be a classification output, a regression output, a sequence output (i.e., that includes a sequence of output elements), a segmentation output, or a combination thereof.

The system described herein is widely applicable and is not limited to one specific implementation. However, for illustrative purposes, a small number of example implementations are described below.

In some implementations, the system trains the neural network to process a set of network inputs that represent the pixels of an image to generate a classification output that includes a respective score for each object category in a set of possible object categories (e.g., vehicle, pedestrian, bicyclist, etc.). The score for an object category can define a likelihood that the image depicts an object that belongs to the object category.

In some implementations, the system trains the neural network to process a set of network inputs that represent audio samples in an audio waveform to perform speech recognition, i.e., to generate an output that defines a sequence of phonemes, graphemes, characters, or words corresponding to the audio waveform.

In some implementations, the system trains the neural network to process a set of network inputs that represent words in a sequence of words to perform a natural language processing task, e.g., topic classification or summarization. To perform topic classification, the system trains the neural network to generate a network output that includes a respective score for each topic category in a set of possible category categories (e.g., sports, business, science, etc.). The score for a topic category can define a likelihood that the sequence of words pertains to the topic category. To perform summarization, the system trains the neural network to generate a network output that includes an output sequence of words that has a shorter length than the input sequence of words and that captures important or relevant information from the input sequence of words.

In some implementations, the system trains the neural network for a neural machine translation task, e.g., to process a set of network inputs that represent a sequence of text, e.g., a sequence of words, phrases, characters, or word pieces, in one language, to generate a network output that can be a translation of the sequence of text into another language, i.e., a sequence of text in the other language that is a translation of the input sequence of text. As a particular example, the task can be a multi-lingual machine translation task, where the neural network is configured to translate between multiple different source language—target language pairs. In this example, the source language text can be augmented with an identifier that indicates the target language into which the neural network should translate the source language text.

In some implementations, the system trains the neural network to perform an audio processing task. For example, if the network inputs represent a spoken utterance, then the output generated by the neural network can be a score for each of a set of pieces of text, each score representing an estimated likelihood that the piece of text is the correct transcript for the utterance. As another example, if the network inputs represent a spoken utterance, the output generated by the neural network can indicate whether a particular word or phrase ("hotword") was spoken in the utterance. As another example, if the network inputs represent a spoken utterance, the output generated by the neural network can identify the natural language in which the utterance was spoken.

In some implementations, the system trains the neural network to perform a natural language processing or understanding task, e.g., an entailment task, a paraphrase task, a textual similarity task, a sentiment task, a sentence completion task, a grammaticality task, and so on, that operates on a set of network inputs representing text in some natural language.

In some implementations, the system trains the neural network to perform a text to speech task, where the network inputs represent text in a natural language or features of text in a natural language and the network output is a spectrogram, a waveform, or other data defining audio of the text being spoken in the natural language.

In some implementations, the system trains the neural network to perform a health prediction task, where the network inputs represent data derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

In some implementations, the system trains the neural network to perform a text generation task, where the network inputs represent a sequence of text, and the output is another sequence of text, e.g., a completion of the input sequence of text, a response to a question posed in the input sequence, or a sequence of text that is about a topic specified by the first sequence of text. As another example, the network inputs can represent data other than text, e.g., an image, and the output sequence can be text that describes the data represented by the network inputs.

In some implementations, the system trains the neural network to perform an image generation task, where the network inputs represent a conditioning input and the output is a sequence of intensity value inputs for the pixels of an image.

In some implementations, the system trains the neural network to perform an agent control task, where the network inputs represent a sequence of one or more observations or other data characterizing states of an environment and the output defines an action to be performed by the agent in response to the most recent data in the sequence. The agent can be, e.g., a real-world or simulated robot, a control system for an industrial facility, or a control system that controls a different kind of agent.

In some implementations, the system trains the neural network to perform a genomics task, where the network inputs represent a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some implementations, the system trains the neural network to perform a protein modeling task, e.g., where the network inputs represent a protein and the network output characterizes the protein. For example, the network output can characterize a predicted stability of the protein or a predicted structure of the protein.

In some implementations, the system trains the neural network to perform a point cloud processing task, e.g., where the network inputs represent a point cloud (e.g., generated by a lidar or radar sensor) and the network output characterizes, e.g., a type of object represented by the point cloud.

In some implementations, the system trains the neural network to perform a combination of multiple individual machine learning tasks, e.g., two or more of the machine learning tasks mentioned above. For example, the neural network can be configured to perform multiple individual natural language understanding tasks, with the network inputs processed by the neural network including an identifier for the individual natural language understanding task to be performed on network inputs.

The neural network 104 can have any appropriate neural network architecture that enables it to perform its described functions, e.g., performing a machine learning task by processing network inputs 122 to generate corresponding network outputs 124. In particular, the neural network 104 can include any appropriate types of neural network layers (e.g., fully-connected layers, convolutional layers, attention layers, etc.) in any appropriate number (e.g., 10 layers, 100 layers, or 1000 layers), and connected in any appropriate configuration (e.g., as a linear sequence of layers).

Generally, the objective function 108 being optimized by the training system 100 can be any appropriate function that depends on network outputs generated by the neural network. For example, if the machine learning task is a classification task, then the objective function can include a cross-entropy loss term, e.g., that measures a cross entropy between: (1) network outputs generated by the neural network, and (2) target outputs (i.e., that should be generated by the neural network). As another example, if the machine learning task is a regression task, then the objective function can include a squared-error loss term, e.g., that measures a squared error between: (1) network outputs generated by the neural network, and (2) target outputs (i.e., that should be generated by the neural network).

The training system 100 trains the neural network 104 based on a set of training data 106. The training data includes multiple training examples, where each training example includes a network input, and optionally, a target output that should be generated by the neural network by processing the network input. Generally, the network inputs to the neural network and the network outputs of the neural network can be represented as ordered collections of numerical values (e.g., as vectors or a matrices of numerical values).

The training system 100 trains the neural network 104 by updating the values of the neural network parameters 102 at each of multiple iterations using a gradient engine 110, a curvature approximation engine 116, and an update engine 120, which will each be described in more detail below.

At each iteration, the training system 100 samples a current batch of training data 106, e.g., by randomly sampling a predefined number of training examples in order to achieve a representative sample of the training data 106.

At each iteration, the gradient engine 110 processes the current batch of training data to determine a respective current gradient 112 of the objective function 108 at the iteration with respect to each neural network parameter 102 of the neural network 104. More specifically, the gradient engine 110 can process the respective network input from each training example in the current batch of training data using the neural network to generate a corresponding network output. The gradient engine 110 can determine respective gradients of the objective function with respect to the neural network parameters 102 for each network output, e.g., using backpropagation, or any other appropriate technique. The gradient engine 110 can then average the gradients over the network outputs corresponding to the current batch of training data to generate the respective current gradient of the objective function with respect to each neural network parameter of the neural network 104. The current gradient 110 of the objective function with respect to each neural network parameter can be represented, e.g., as a numerical value, and can be understood as characterizing, e.g., the first derivative or slope of the objective function with respect to the neural network parameter.

At each iteration, the curvature approximation engine 116 processes the current gradients 112 of the objective function and previous gradients of the objective function 114 from each of multiple previous iterations to generate an estimate of the objective function curvature 118 with respect to each neural network parameter. The curvature approximation engine 116 processes the current gradient, the previous gradients, and the respective neural network parameter values to estimate the objective function curvature by determining the parameter values of a gradient approximation function. The gradient approximation function is a function that processes the values of the network parameters of the neural network to generate an estimate of the respective gradient of the objective function with respect to each neural network parameter. The objective function curvatures 118 can be represented, e.g., as numerical values, and can be understood as characterizing, e.g., the second derivatives of the objective function with respect to the neural network parameters.

In some cases, the curvature approximation engine can use a linear gradient approximation function whose parameters comprise respective slope and root parameters corresponding to each neural network parameter to estimate the objective function gradient with respect to the neural network parameter. The curvature approximation engine can then estimate the respective objective function curvature with respect to a neural network parameter as the slope parameter of the respective linear gradient approximation function corresponding to the neural network parameter. An example process for estimating the curvatures of the objective function with respect to the neural network parameters is described in more detail with reference to FIG. 3.

At each iteration, the update engine 120 updates the current values of the neural network parameters 102 based on the estimated objective function curvatures 118 with respect to the neural network parameters.

For example, the update engine can determine a respective target value of a network parameter based on the sign of its respective objective function curvature 118. The update engine can then sample the value of the network parameter 102 from a uniform probability distribution over a range of values centered on the target value of the network parameter (the network parameter's "trust region"). Updating the current values of the neural network parameters using the estimated curvatures, rather than relying solely on first-order gradient information, can enable the system to train the neural network to achieve an acceptable performance on a machine learning task over fewer training iterations, thereby reducing consumption of computational resources. Computational resources can include, e.g., memory and computing power. Updating the current values of the neural network parameters by sampling from their respective trust regions can ensure that the values of the neural network parameters are well-spread in their respective trust regions to improve numerical stability of the training procedure. An example process for updating current values of neural network parameters using the estimated curvature of an objective function is described in more detail with reference to FIG. 4.

Figure 2:
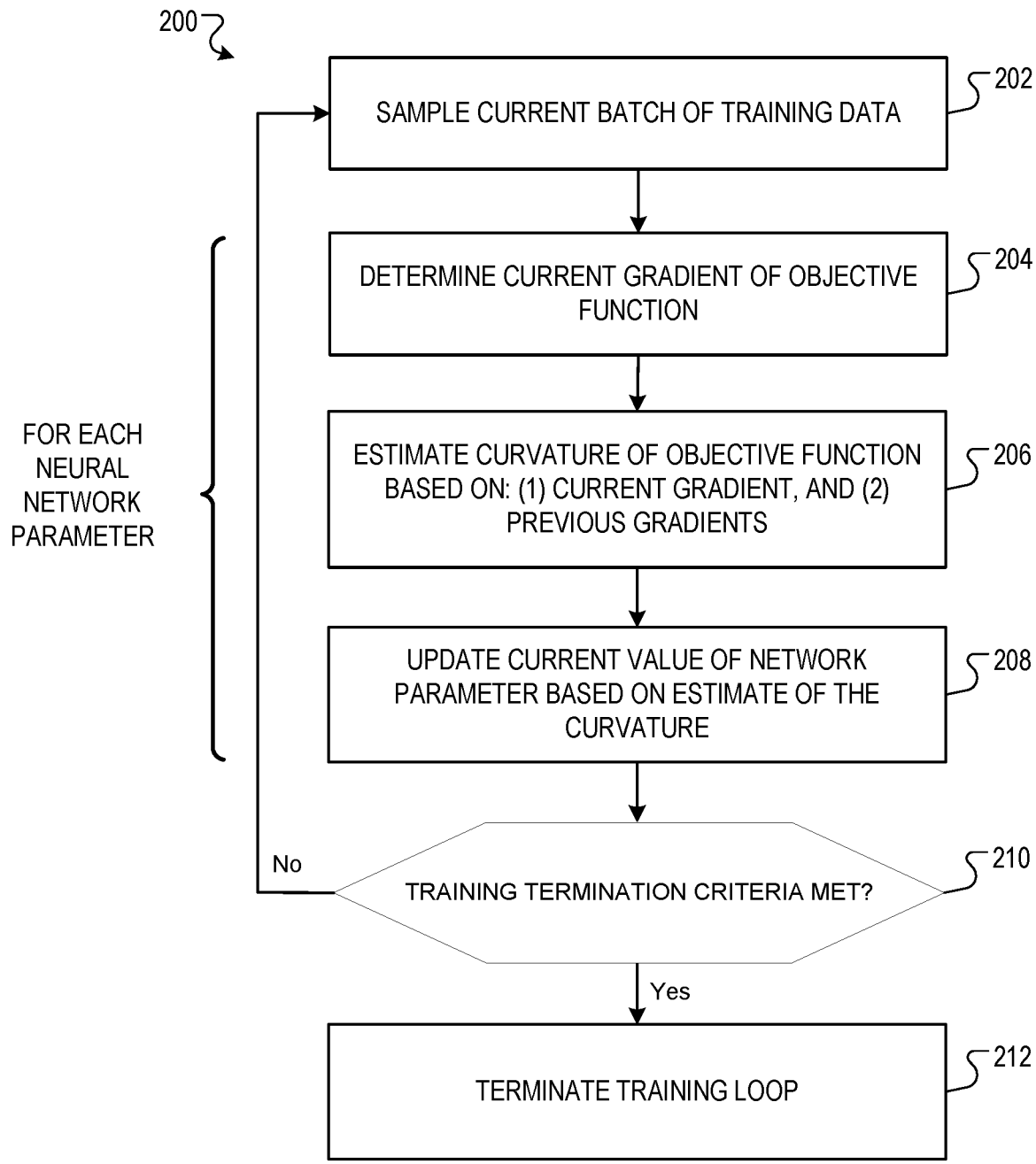
FIG. 2 is a flow diagram of an example process for training a neural network using the estimated curvature of an objective function.

FIG. 2 is a flow diagram of an example process for training a neural network using estimates of the curvature of an objective function with respect to the parameter values of the neural network. For convenience, the process 200 will be described as being performed by a system of one or more computers located in one or more locations. For example, a training system, e.g., the training system 100 of FIG. 1, appropriately programmed in accordance with this specification, can perform the process 200.

The system samples a current batch of training data (202). For example, the system can randomly sample a predefined number of training examples from the training data, e.g., to generate a representative sample of the entire set of training data.

The system processes the current batch of training data to generate the current gradient of the objective function with respect to each neural network parameter (204). For example, the system can generate a respective gradient for each training example and generate the current gradient of the objective function with respect to each neural network parameter by averaging over the set of respective gradients for each training example, as described in more detail above with reference to FIG. 1.

The system processes (i) the current gradient of the objective function and (ii) multiple previous gradients of the objective function to estimate the curvature of the objective function with respect to each neural network parameter (206). For example, the system can estimate the curvature of an objective function by determining the values of the respective parameters of a gradient approximation function, i.e., a function that processes the values of the network parameters of the neural network to generate an estimate of the gradient of the objective function with respect to each neural network parameter.

In some cases, the system can use a linear gradient approximation function. The linear gradient approximation function used by the system to estimate the curvature can be represented as, $$g_i \approx \beta_i(x_i - r_i) \tag{1}$$

with $x_i$ being the network parameter value, $g_i$ being the gradient, $\beta_i$ and $r_i$ being the slope and root parameters, respectively, and i denoting with respect to which neural network parameter the gradient is taken and the slope and root parameters correspond. An example process for estimating the curvature of an objective function by determining the values of the parameters of a linear gradient approximation function, namely a slope parameter and a root parameter, is described in more detail with reference to FIG. 3.

The system processes the objective function curvature estimates to update the current value of each neural network parameter (208). In some cases, the update engine can use the respective curvature estimate for each neural network parameter to determine a target value for the neural network parameter and then sample an updated value of the neural network parameter from a uniform probability distribution centered on the target value of the network parameter (its "trust region"). Updating each neural network parameter value by sampling from its respective trust region can ensure the values of the network parameters are well-spread in their respective trust regions to improve numerical stability across training. An example process for updating the current value of a network parameter based on the sign of the objective function curvature with respect to the network parameter is described in more detail with reference to FIG. 4.

The system evaluates whether the training termination criteria have been met to determine whether to begin a new training iteration or to terminate training (210). For example, the system can evaluate the single criterion of whether or not a predefined number of training iterations have been performed. If the specified number of iterations has not yet been performed, the system can then loop back to step 202 to sample a new random batch of training data, or, if at least the specified number of training iterations has been performed, the system can proceed to step (212) to terminate training.

Figure 3:
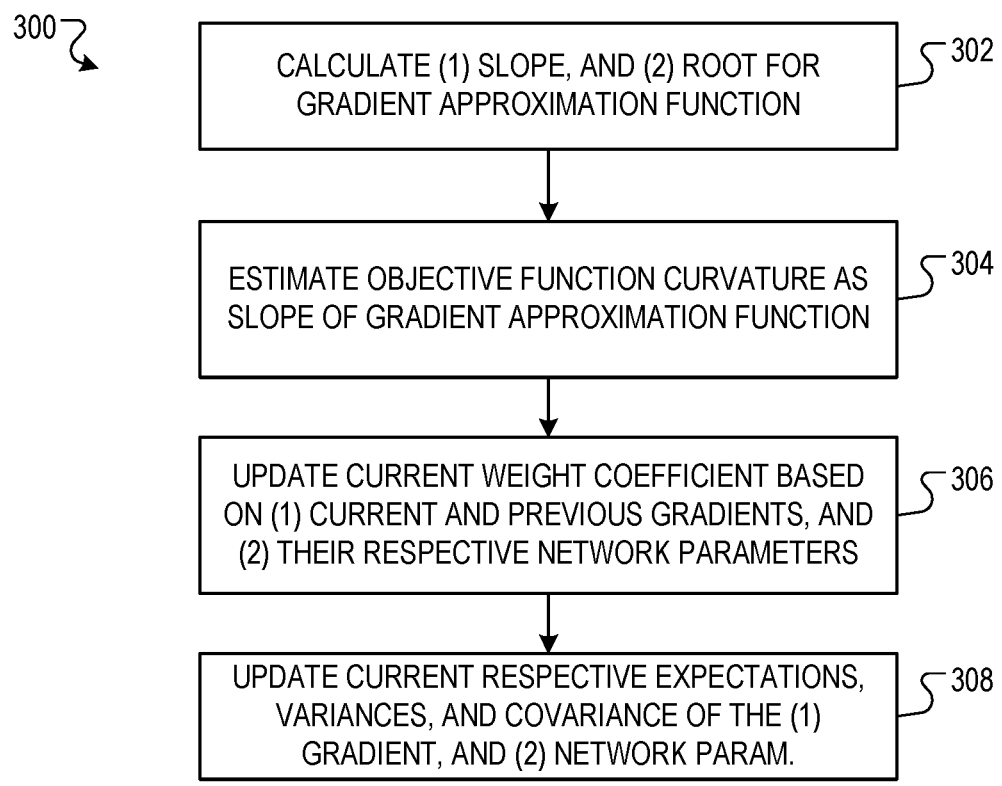
FIG. 3 is a flow diagram of an example process for estimating the curvature of an objective function using a gradient approximation function.

FIG. 3 is a flow diagram of an example process for estimating the curvature of an objective function using a linear gradient approximation function. For convenience, the process 300 will be described as being performed by a system of one or more computers located in one or more locations. For example, a curvature approximation engine, e.g., the curvature approximation engine 116 of FIG. 1, appropriately programmed in accordance with this specification, can perform the process 300.

The system calculates the respective slope and root parameter values of a linear gradient approximation function (302), e.g., the linear gradient approximation function shown in equation (1). In some cases, the slope parameter can be estimated as the ratio between a covariance of a respective value of the objective function gradient $g_i$ and a respective value of the network parameter $x_i$ over the current iteration and each of multiple previous iterations, and a variance of the respective value of the neural network parameter $x_i$ over the current iteration and each of multiple previous iterations, as, e.g., in equations (10)-(14) for the covariance and variance terms, and, $$\beta_i = \frac{\mathrm{Cov}(x_i, g_i)}{\mathrm{Var}(x_i)}, \tag{2}$$

for the slope parameter. The root parameter can be estimated as the difference between an expectation of the respective value of the neural network parameter $x_i$ over the current and each of multiple previous iterations, and a ratio of an expectation of the respective value of the objective function gradient $g_i$ over the current iteration and each of multiple previous iterations and the value of the slope parameter $\beta_i$, e.g., as, $$r_i = E(x_i) - \frac{E(g_i)}{\beta_i} \tag{3}$$

For example, the system can determine the slope and root parameters of a linear gradient approximation function by minimizing the error between the gradient of the objective function at each iteration and the estimate of the gradient from the linear gradient approximation function at each iteration, where the error for each iteration can be represented as, $$\beta_i(x_i - r_i) - g_i, \tag{4}$$

so that the overall error to be minimized can be represented as, $$\frac{1-\alpha_i^t}{1-\alpha_i}\sum_{s=1}^{t}\alpha_i^{t-s}[\beta_i(t)\cdot(x_i(s) - r_i(t)) - g_i(s)]^2, \tag{5}$$

where $0 < \alpha_i < 1$ is a weight coefficient for each respective network parameter and s denotes the respective iteration up to current iteration t. One possible solution to minimizing the overall error represented in equation (5) is given by equations (2) and (3).

The system processes the slope and root parameters from the linear gradient approximation functions to set the estimates of the objective function curvatures equal to the slope parameters (304). For example, the system can determine the objective function curvature estimate with respect to each neural network parameter $x_i$ as equal to its respective slope parameter $\beta_i$.

The system processes the (i) current gradient and previous gradients with respect to each network parameter, and (ii) the respective values of the network parameter at each iteration to update the respective weight coefficient for the network parameter (e.g., denoted above as $\alpha_i$ in equation (5)) (306). For example, the engine can set a target value for the current respective weight coefficient so that the variance about the respective root is proportional to the variance of the respective network parameter, e.g., $$\alpha_i^*(t) = c_\alpha \frac{\text{Cov}(x_i, g_i)^2}{\text{Var}(x_i)\text{Var}(g_i)}, \qquad (6)$$

where $c_\alpha < 1$ is a hyperparameter, $x_i$ is the respective value of the network parameter, $g_i$ is the respective value of the objective function gradient, and i denotes with respect to which network parameter the gradient is taken and the variance and covariance correspond. The system can then update the value of the respective weight coefficient as, $$\alpha_i(t+1) = \text{clip}(\alpha_i^*, \alpha_i(t) - \alpha_i(t)^2, \alpha_{max}) \qquad (7),$$

where $\alpha_{max}$ is a hyperparameter and clip(r,a,b) defines a function where the output equals a if r≤a, equals r if a<r<b, or equals b if r≥b. Updating the weight coefficient by sampling within this region both prevents the weight coefficient from decreasing too quickly and prevents the weight coefficient from increasing above a predefined maximum threshold.

The system updates the current respective expectations, variances, and covariance of the (i) gradients and (ii) network parameters using their respective weight coefficients (308).

For example, the system can update these statistical quantities using a set of intermediate coefficients based upon the weight coefficient. Updating the weight coefficient as in equations (6) and (7), the system can use a set of intermediate coefficients, $$w_i \leftarrow (1-\alpha_i)w_i + \alpha_i, \qquad (8)$$

$$\in_i \leftarrow \alpha_i / w_i \qquad (9),$$

where $w_0 = 0$ and $\alpha_0 = \alpha_{max}$ to update the statistical quantities as, $$\text{Var}(x_i)(1-\in_i)\text{Var}(x_i) + \in_i(1-\in_i)(x_i-(Ex_i))^2, \qquad (10)$$

$$\text{Var}(g_i)(1-\in_i)\text{Var}(g_i) + \in_i(1-i)(g-(Eg_i))^2, \qquad (11)$$

$$\text{Cov}(x_i, g_i) \leftarrow (1-\in_i)\text{Cov}(x_i, g_i) + i(1-i)(x_i-(Ex_i))(g_i-(Eg_i)), \qquad (12)$$

$$(Ex_i) \leftarrow (1-\in_i)(Ex_i) + \in_i x_i, \qquad (13)$$

$$(Eg_i) \leftarrow (1-\in\in_i)(Eg_i) + \in_i g_i. \qquad (14)$$

Figure 4:
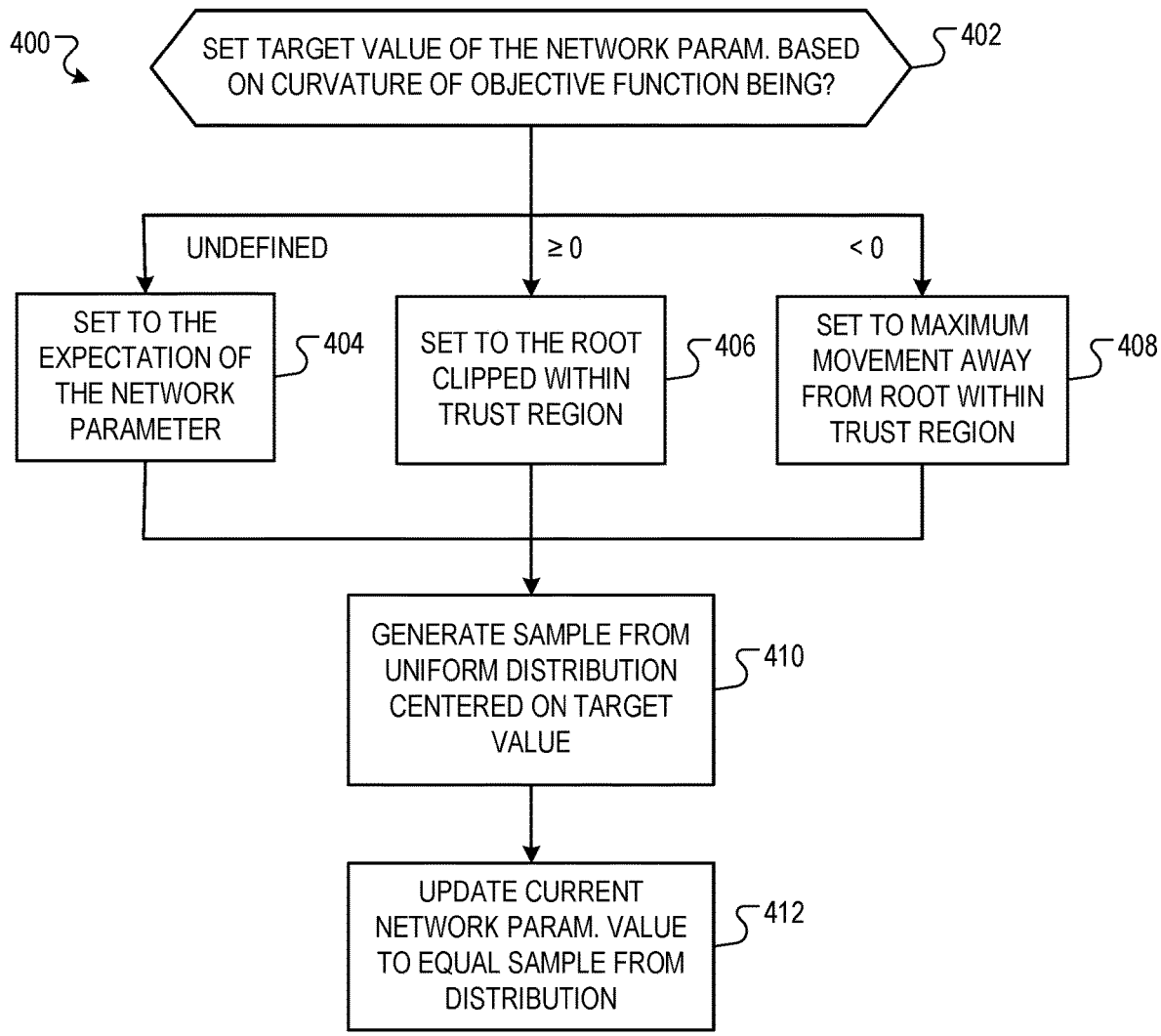
FIG. 4 is a flow diagram of an example process for updating the current value of a neural network parameter using the curvature of an objective function.

FIG. 4 is a flow diagram of an example process for updating the value of a neural network parameter. For convenience, the process 400 will be described as being performed by a system of one or more computers located in one or more locations. For example, an update engine, e.g., the update engine 120 of FIG. 1, appropriately programmed in accordance with this specification, can perform the process 400.

The system processes the objective function curvature to set a target value of its respective network parameter (402). For example, the system can set a target value based upon the value of the objective function curvature and clipped (as the clip function above) within a trust region over a range of values centered on the current expectation value of the network parameter. Determining a target value in this manner can help prevent numerical instability and cyclic updates.

If the curvature is undefined, the system can set the target value of the network parameter equal to the current expectation value of the network parameter (404). For example, the curvature can be undefined in the first iteration of training. The variance of the value of the neural network parameter is zero, which causes the slope parameter, calculated, e.g., using equation (2), to be undefined due to division by zero.

If the sign of the curvature is non-negative, the system can set the target value of the network parameter to the root parameter, clipped within a trust region centered on the expectation value of the network parameter (406). For example, the target value of the network parameter value can be set to the respective root parameter clipped within a trust region with width equal to some multiple of the square root of the variance of the value of the network parameter and centered on the expectation value of the network parameter, as $$x_i^* = \text{clip}(r_i, Ex_i - \delta_i, Ex_i + \delta_i), \qquad (15)$$

$$\delta_i = \max\left\{c_{trust}\text{Var}(x_i)^{\frac{1}{2}}, v\right\}, \qquad (16)$$

where $c_{trust} > 1$ and $v > 0$ are hyperparameters, $x_i$ is the respective value of the network parameter, $g_i$ is the respective value of the gradient, $\delta_i$ is the width of the respective trust region, and i denotes with respect to which network parameter the quantities correspond, e.g., with respect to which network parameter the gradient is taken. In this example, the variance initially being zero forces the region to have zero width, which would never allow the parameter to step away from its initial value. Forcing the width, $\delta_i$, to have some minimum value, v, allows for a step away from the starting position.

If the sign of the curvature is negative, the system can set the target value of the network parameter so that the distance between the target value of the network parameter and the value of the root parameter is greater than the distance between the current value of the network parameter and the value of the root parameter, clipped within a trust region centered on the expectation value of the network parameter (408). For example, the system can determine the target value based on the root parameter value relative to the expectation value of the network parameter, as $$x_i^* = \begin{cases} Ex_i - \delta_i & \text{if } r_i > Ex_i \\ Ex_i + \delta_i & \text{if } r_i < Ex_i \end{cases}, \qquad (17)$$

which generates a maximal step away from the root, within a trust region.

The system setting the target value of the parameter as in (402), (404), (406), and (408) generates a maximal movement toward or away from the root, clipped within a trust region. If the curvature is non-negative, the system can generate a step toward the root, which is a potential minimum. If the curvature is negative, the system can generate a step away from the root, away from a potential maximum. Clipping the step can prevent numerical instability.

The system generates a sample from a uniform probability distribution over a range of values centered on the target value of the network parameter (410). For example, the system can generate a sample from a uniform probability distribution over a range of values centered on the target value of the network parameter and with width determined as, $$a_i = \max\{x_i^* - v_i Ex_i - \delta_i\} \quad (18)$$

$$b_i = \min\{x_i^* + v_i Ex_i + \delta_i\} \quad (19)$$

The system updates the neural network parameter as equal to the distribution sample (412). For example, the neural network parameter update can be drawn as $$x_i(t+1) \sim U(a_i, b_i), \quad (20),$$

in order to ensure that the values of the network parameters are well-spread in the trust regions to prevent numerical instability.

As an alternative to performing steps (410)-(412), optionally, the system can directly set the updated value of the neural network parameter equal to the target value of the neural network parameter.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which can also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program can, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method performed by one or more data processing apparatus for training a neural network having a plurality of neural network parameters to perform a machine learning task by optimizing an objective function, the method comprising, at each of a plurality of iterations:

sampling a current batch of training data;

for each neural network parameter of the plurality of neural network parameters:

determining, based on the current batch of training data, a respective current gradient of the objective function at the current iteration with respect to the neural network parameter;

estimating a curvature of the objective function with respect to the neural network parameter based on: (i) the current gradient of the objective function at the current iteration, and (ii) a respective previous gradient of the objective function at each of a plurality of previous iterations, wherein estimating the curvature of the objective function with respect to the neural network parameter comprises:

determining values of parameters of an approximation function that is configured to process a provided value of the neural network parameter to generate an estimate of a gradient of the objective function with respect to the neural network parameter when the neural network parameter has the provided value, and wherein determining the values of the parameters of the approximation function comprises:
  determining the values of the parameters of the approximation function to minimize an overall error,
  wherein the overall error is based on a respective error for the current iteration and each of the plurality of previous iterations,
  wherein the error for each respective iteration measures a difference between: (i) the gradient of the objective function at the iteration, and (ii) an estimate of the gradient of the objective function at the iteration that is generated by processing a value of the neural network parameter at the iteration using the approximation function; and
  updating a current value of the neural network parameter based on the estimate of the curvature of the objective function with respect to the neural network parameter at the current iteration;
wherein updating values of the neural network parameters based on estimates of the curvature of the objective function reduces a number of training iterations required for the neural network to achieve a threshold performance on the machine learning task.

2. The method of claim 1, wherein the curvature of the objective function with respect to the neural network parameter characterizes a second derivative of the objective function with respect to the neural network parameter.

3. The method of claim 1, wherein the approximation function is a linear function, the parameters of the approximation function comprise a slope parameter and a root parameter, and the slope parameter of the approximation function defines the estimate of the curvature of the objective function with respect to the neural network parameter.

4. The method of claim 3, wherein processing a provided value of the neural network parameter to generate an estimate of the gradient of the objective function with respect to the neural network parameter when the neural network parameter has the provided value comprises:
  subtracting the value of the root parameter from the provided value of the neural network parameter; and
  multiplying: (i) the slope parameter, and (ii) a result of the subtraction.

5. The method of claim 1, wherein the overall error comprises a linear combination of the respective error for the current iteration and each of the plurality of previous iterations, wherein each error is scaled by a respective weight coefficient.

6. The method of claim 5, further comprising updating a current value of each respective weight coefficient based on a respective value of the gradient of the objective function and a respective value of the neural network parameter at the current iteration and each of the plurality of previous iterations.

7. The method of claim 6, wherein for each respective weight coefficient, updating the current value of the weight coefficient comprises:
  determining a target value of the weight coefficient based on: (i) a variance of the values of the gradient of the objective function, (ii) a variance of the values of the neural network parameter, and (iii) a covariance of the values of the gradient of the objective function and the values of the neural network parameter; and
  updating the current value of the weight coefficient based on the target value of the weight coefficient.

8. The method of claim 3, wherein determining the value of the slope parameter comprises:
  determining the value of the slope parameter as a ratio of:
    (i) a covariance of a respective value of the gradient of the objective function and a respective value of the neural network parameter over the current iteration and each of the plurality of previous iterations, and (ii) a variance of the respective value of the neural network parameter over the current iteration and each of the plurality of previous iterations.

9. The method of claim 8, wherein determining the value of the root parameter comprises:
  determining the value of the root parameter as a difference between:
    an expectation of the respective value of the neural network parameter over the current iteration and each of the plurality of previous iterations, and
    a ratio of: (i) an expectation of the respective value of the gradient of the objective function over the current iteration and each of the plurality of previous iterations, and (ii) the value of the slope parameter.

10. The method of claim 1, wherein the error for each iteration is a squared-error between: (i) the gradient of the objective function at the iteration, and (ii) the estimate of the gradient of the objective function at the iteration that is generated by processing the value of the neural network parameter at the iteration using the approximation function.

11. The method of claim 3, wherein updating the current value of the neural network parameter comprises:
  determining a target value of the neural network parameter based on: (i) a sign of the curvature, and (ii) the value of the root parameter; and
  updating the current value of the neural network parameter based on the target value of the neural network parameter.

12. The method of claim 11, wherein the sign of the curvature is non-negative, and determining the target value of the neural network parameter comprises:
  determining the target value of the neural network parameter to be equal to the value of the root parameter.

13. The method of claim 12, further comprising:
  determining a trust region, wherein the trust region defines a range of numerical values, comprising:
    determining a center of the trust region based on an expectation of the respective value of the neural network parameter over the current iteration and each of the plurality of previous iterations, and
    determining a width of the trust region based on a variance of the respective value of the neural network parameter over the current iteration and each of the plurality of previous iterations; and
  clipping the target value of the neural network parameter to be included in the trust region.

14. The method of claim 11, wherein the sign of the curvature is negative, and determining the target value of the neural network parameter comprises:
  determining the target value of the neural network parameter such that a distance between: (i) the target value of the neural network parameter, and (ii) the value of the root parameter, is greater than a distance between: (i) the current value of the neural network parameter, and (ii) the value of the root parameter.

15. The method of claim 11, wherein updating the current value of the neural network parameter based on the target value of the neural network parameter comprises:
  setting the updated value of the neural network parameter equal to the target value of the neural network parameter.

16. The method of claim 11, wherein updating the current value of the neural network parameter based on the target value of the neural network parameter comprises:
sampling the updated value of the neural network parameter from a uniform probability distribution over a range of values that is centered on the target value of the neural network parameter.

17. The method of claim 1, wherein the neural network is trained to perform an image processing task that comprises processing an image to generate one or more of: a classification of the image, or a regression output characterizing the image, or a segmentation of the image.

18. The method of claim 1, wherein the neural network is trained to perform an audio processing task that comprises processing audio data to generate one or more of: a classification of the audio data, or a regression output characterizing the audio data, or a segmentation of the audio data.

19. A system comprising:
one or more computers; and
one or more storage devices communicatively coupled to the one or more computers, wherein the one or more storage devices store instructions that, when executed by the one or more computers, cause the one or more computers to perform operations for training a neural network having a plurality of neural network parameters to perform a machine learning task by optimizing an objective function, the operations comprising, at each of a plurality of iterations:
sampling a current batch of training data;
for each neural network parameter of the plurality of neural network parameters:
determining, based on the current batch of training data, a respective current gradient of the objective function at the current iteration with respect to the neural network parameter;
estimating a curvature of the objective function with respect to the neural network parameter based on: (i) the current gradient of the objective function at the current iteration, and (ii) a respective previous gradient of the objective function at each of a plurality of previous iterations, wherein estimating the curvature of the objective function with respect to the neural network parameter comprises:
determining values of parameters of an approximation function that is configured to process a provided value of the neural network parameter to generate an estimate of a gradient of the objective function with respect to the neural network parameter when the neural network parameter has the provided value, and wherein determining the values of the parameters of the approximation function comprises:
determining the values of the parameters of the approximation function to minimize an overall error,
wherein the overall error is based on a respective error for the current iteration and each of the plurality of previous iterations,
wherein the error for each respective iteration measures a difference between: (i) the gradient of the objective function at the iteration, and (ii) an estimate of the gradient of the objective function at the iteration that is generated by processing a value of the neural network parameter at the iteration using the approximation function; and
updating a current value of the neural network parameter based on the estimate of the curvature of the objective function with respect to the neural network parameter at the current iteration;
wherein updating values of the neural network parameters based on estimates of the curvature of the objective function reduces a number of training iterations required for the neural network to achieve a threshold performance on the machine learning task.

20. One or more non-transitory computer storage media storing instructions that when executed by one or more computers cause the one or more computers to perform operations for training a neural network having a plurality of neural network parameters to perform a machine learning task by optimizing an objective function, the operations comprising, at each of a plurality of iterations:
sampling a current batch of training data;
for each neural network parameter of the plurality of neural network parameters:
determining, based on the current batch of training data, a respective current gradient of the objective function at the current iteration with respect to the neural network parameter;
estimating a curvature of the objective function with respect to the neural network parameter based on: (i) the current gradient of the objective function at the current iteration, and (ii) a respective previous gradient of the objective function at each of a plurality of previous iterations, wherein estimating the curvature of the objective function with respect to the neural network parameter comprises:
determining values of parameters of an approximation function that is configured to process a provided value of the neural network parameter to generate an estimate of a gradient of the objective function with respect to the neural network parameter when the neural network parameter has the provided value, and wherein determining the values of the parameters of the approximation function comprises:
determining the values of the parameters of the approximation function to minimize an overall error,
wherein the overall error is based on a respective error for the current iteration and each of the plurality of previous iterations,
wherein the error for each respective iteration measures a difference between: (i) the gradient of the objective function at the iteration, and (ii) an estimate of the gradient of the objective function at the iteration that is generated by processing a value of the neural network parameter at the iteration using the approximation function; and
updating a current value of the neural network parameter based on the estimate of the curvature of the objective function with respect to the neural network parameter at the current iteration;
wherein updating values of the neural network parameters based on estimates of the curvature of the objective function reduces a number of training iterations required for the neural network to achieve a threshold performance on the machine learning task.

* * * * *